United States Patent
Hwang et al.

(10) Patent No.: US 9,294,590 B2
(45) Date of Patent: Mar. 22, 2016

(54) FRAME CONVERSION APPARATUS FOR CONVERTING CONTROLLER AREA NETWORK FRAME INTO ETHERNET FRAME AND FRAME CONVERSION METHOD THEREOF

(71) Applicant: Electronics and Telecommunications Research Institute, Daejeon-si (KR)

(72) Inventors: Hyun-Yong Hwang, Daejeon-si (KR); Jeong-Hwan Lee, Gyeonggi-do (KR); Tae-Man Han, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 175 days.

(21) Appl. No.: 13/973,417

(22) Filed: Aug. 22, 2013

(65) Prior Publication Data
US 2014/0126584 A1    May 8, 2014

(30) Foreign Application Priority Data
Nov. 6, 2012    (KR) .................. 10-2012-0124959

(51) Int. Cl.
*H04L 29/06*    (2006.01)
*H04L 12/413*    (2006.01)
*H04L 12/46*    (2006.01)
*H04L 12/40*    (2006.01)

(52) U.S. Cl.
CPC .............. *H04L 69/08* (2013.01); *H04L 12/413* (2013.01); *H04L 12/4625* (2013.01); *H04L 2012/40215* (2013.01)

(58) Field of Classification Search
CPC ........................................................ H04L 69/08
USPC .................. 370/392, 401, 397, 466
See application file for complete search history.

(56) References Cited

U.S. PATENT DOCUMENTS

| | | | |
|---|---|---|---|
| 7,065,152 B2 | 6/2006 | Gottshall et al. | |
| 7,260,120 B2* | 8/2007 | Kang et al. | 370/535 |
| 7,394,835 B2* | 7/2008 | Youn et al. | 370/535 |
| 7,496,115 B2* | 2/2009 | Choi et al. | 370/535 |
| 8,826,261 B1* | 9/2014 | Ag et al. | 717/168 |
| 2004/0136712 A1* | 7/2004 | Stiscia et al. | 398/60 |
| 2005/0254518 A1* | 11/2005 | Fujimori | 370/466 |
| 2006/0109849 A1* | 5/2006 | Uchimoto et al. | 370/395.1 |
| 2007/0171912 A1* | 7/2007 | Mitsumori | 370/395.1 |
| 2007/0223496 A1* | 9/2007 | Izumi | 370/397 |
| 2009/0067429 A1* | 3/2009 | Nagai et al. | 370/392 |
| 2009/0245251 A1* | 10/2009 | Koide | 370/390 |
| 2010/0067901 A1* | 3/2010 | Mizutani et al. | 398/20 |
| 2012/0140673 A1* | 6/2012 | Tateno | 370/253 |
| 2012/0327939 A1* | 12/2012 | Jang | 370/392 |
| 2014/0119281 A1* | 5/2014 | Kummetz et al. | 370/328 |

FOREIGN PATENT DOCUMENTS

| KR | 10-0436162 A | 6/2004 |
|---|---|---|
| KR | 2006-0082680 A | 7/2006 |

(Continued)

*Primary Examiner* — Parth Patel
(74) *Attorney, Agent, or Firm* — Rabin & Berdo, P.C.

(57) ABSTRACT

A frame conversion apparatus for converting a CAN frame into an Ethernet frame and a frame conversion method thereof, configured to efficiently convert CAN frame data into Ethernet frame data, to achieve high-speed and high-volume transmission.

6 Claims, 9 Drawing Sheets

(56) References Cited

FOREIGN PATENT DOCUMENTS

| KR | 2011-0057371 A | 6/2011 | | |
| KR | 20110057371 | * 6/2011 | ............ | H04L 12/28 |
| KR | 2011-0082430 A | 7/2011 | | |

* cited by examiner

FIG. 5

| CAN ID | FF N_PDU | CF N_Data | CF N_Data | CF N_Data | CF N_Data | CF N_Data |

FIG. 6

| N_PDU name | N_PCI bytes | | | |
|---|---|---|---|---|
| | Byte #1 | | Byte #2 | Byte #3 |
| | Bits 7-4 | Bits 3-0 | | |
| FIRST FRAME | N_PCItype=1 | FF_DL | | N/A |
| SECOND FRAME | N_PCItype=2 | SN | N/A | N/A |

FIRST FRAME REGION

FF N_PDU = FF N_PCI + FF N_Data

SECOND FRAME REGION

CF N_PDU = CF N_PCI + CF N_Data

FRAME CONVERSION APPARATUS FOR CONVERTING CONTROLLER AREA NETWORK FRAME INTO ETHERNET FRAME AND FRAME CONVERSION METHOD THEREOF

CROSS-REFERENCE TO RELATED APPLICATION

This application claims priority from Korean Patent Application No. 10-2012-0124959, filed on Nov. 6, 2012, in the Korea Intellectual Property Office, the entire disclosure of which is incorporated herein by reference for all purposes.

BACKGROUND

1. Field

The following description relates to technology for frame data conversion, and more particularly, to a frame conversion apparatus for converting a controller area network frame into an Ethernet frame, and a frame conversion method thereof.

2. Description Of the Background

Controller Area Network (CAN) is an efficient serial communication protocol that supports distributed real-time control with a very high security level. A CAN network using a CAN frame provides a number of benefits such as multi-master support, priority processing, and minute error detection, and thus is widely used in various industries, in particular, in a vehicle network.

Due to explosive increase in the number of Internet users and existing data services, coupled with the development of various types of multimedia services, such as digital broadcasting, video calling, Video on Demand (VoD), Internet Protocol Television (IPTV), and Voice over IP (VoIP), and the state-of-the art equipment such as a hub, a switch and a router, a packet network is widely used in a Local Area Network (LAN) and a Wide Area Network (WAN).

Automobiles of the past were nothing more than a simple transportation system for delivering people or cargo, but automobiles of today are used as an infotainment system having functions of information and entertainment in addition to the function of the conventional transportation system.

Accordingly, in order to support vehicle multimedia services, an Ethernet frame of the packet network is being introduced into a vehicle network to transmit a large amount of data at a high speed.

However, the CAN frame that transmits data in the CAN network has a different frame format from the Ethernet frame that transmits data in the packet network, and thus data transmission is impossible without frame conversion.

Accordingly, there is need for a method for converting the CAN frame of the CAN network into the Ethernet frame of the packet network, and the inventor of the present invention conducted research into technology for efficiently converting CAN frame data into Ethernet frame data.

As relevant technology, a gateway apparatus for sharing information between a MOST network system and a CAN network system is suggested in Korean Patent Registration No. 10-0436162 (Jun. 4, 2004).

SUMMARY

The following description relates to a frame conversion apparatus for converting a CAN frame into an Ethernet frame that is capable of efficiently converting CAN frame data into Ethernet frame data, and a frame conversion method thereof.

In one general aspect, there is provided a frame conversion apparatus for converting a CAN frame into an Ethernet frame, the apparatus including: a CAN frame receiving unit configured to receive CAN frames from a CAN network domain; a CAN frame analysis unit configured to analyze the CAN frames received by the CAN frame receiving unit, and extract data to be transmitted; an Ethernet frame generating unit configured to generate an Ethernet frame including an identifier, a first frame region which is selective and includes information about a length of data transmitted, and a plurality of second frame regions which selectively include information about a data segment assembly sequence, as a data field, wherein the data extracted by the CAN frame analysis unit to be transmitted is disassembled into segments of data in units of a certain number of bytes and the disassembled segments of data are arranged by distribution to the first frame region and the second frame regions; and an Ethernet frame transmitting unit configured to transmit the Ethernet frame generated by the Ethernet frame generating unit to an Ethernet network domain.

The Ethernet frame generating unit, in a case in which all of the second frame regions can be transmitted in a single Ethernet frame, may include only the data segments and not the information about the data segment assembly sequence in the second frame region.

The Ethernet frame generating unit, in a case in which all of the second frame regions cannot be transmitted in a single Ethernet frame and are transmitted in a plurality of Ethernet frames, may include only the identifier and the second frame regions, not the first frame region, in a second and following Ethernet frames.

The Ethernet frame generating unit may include the information about the data segment assembly sequence in a preceding second frame region among second frame regions included in the second and following Ethernet frames.

The Ethernet frame generating unit may dynamically adjust numbers of the first frame region and the second frame regions included in an Ethernet frame so as to minimize an unused portion of the Ethernet frame.

In another general aspect, there is provided a frame conversion method of a frame conversion apparatus for converting a CAN frame into an Ethernet frame, the method including: receiving CAN frames from a CAN network domain; analyzing the received CAN frames to extract data to be transmitted; generating an Ethernet frame including an identifier, a first frame region which includes information about a length of data transmitted, and a plurality of second frame regions which selectively include information about a data segment assembly sequence, as a data field, wherein the data extracted in the analyzing of the CAN frames to be transmitted is disassembled into segments of data in units of a certain number of bytes and the disassembled segments of data are arranged by distribution to the first frame region and the second frame regions; and transmitting the generated Ethernet frame to an Ethernet network domain.

The generating of the Ethernet frame, in a case in which all of the second frame regions can be transmitted in a single Ethernet frame, may comprise including only the data segments and not the information about the data segment assembly sequence in the second frame region.

The generating of the Ethernet frame, in a case in which all of the second frame regions cannot be transmitted in a single Ethernet frame and are transmitted in a plurality of Ethernet frames, may include including only the identifier and the second frame regions, not the first frame region, in a second and following Ethernet frames.

The generating of the Ethernet frame may include including the information about the data segment assembly sequence in a preceding second frame region among the second frame regions included in the second and following Ethernet frames.

The generating of the Ethernet frame may include dynamically adjusting numbers of the first frame region and the second frame regions included in an Ethernet frame so as to minimize an unused portion of the Ethernet frame.

As is apparent from the above, high-speed and high-capacity transmission is achieved by efficiently converting the CAN frame data into the Ethernet frame data.

Other features and aspects will be apparent from the following detailed description, the drawings, and the claims.

BRIEF DESCRIPTION OF THE DRAWINGS

FIG. 5 is a diagram illustrating a structure of a data field of an Ethernet frame generated by the CAN-to-Ethernet frame conversion apparatus in accordance with an example embodiment of the present invention.

FIG. 6 is a diagram illustrating an example of a specification of a data field of an Ethernet frame.

Figure 1:
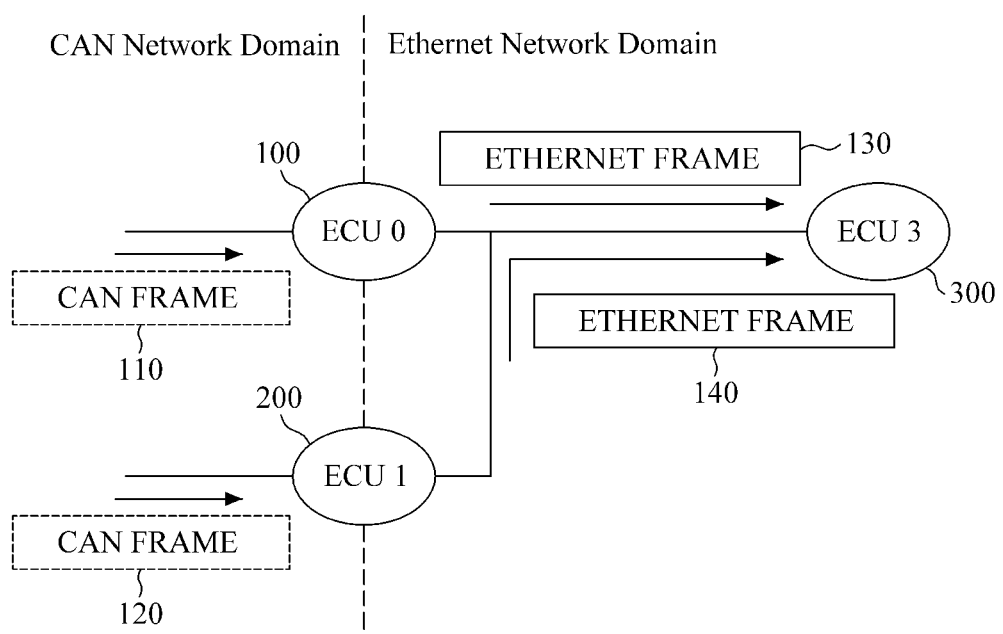
FIG. 1 is a diagram illustrating a vehicle network having a CAN network domain mixed with an Ethernet network domain.

Throughout the drawings and the detailed description, unless otherwise described, the same drawing reference numerals will be understood to refer to the same respective elements, features, and structures. The relative size and depiction of elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness. In addition, terms described below are terms defined in consideration of functions in the present invention and may be changed according to the intention of a user or an operator or conventional practice. Therefore, the definitions must be based on content throughout this disclosure.

FIG. 1 is a diagram illustrating a vehicle network having a CAN network domain mixed with an Ethernet network domain. In a case in which a large volume of data is transmitted from a CAN network domain to an ECU0 100 and ECU1 200, the data is transmitted through a plurality of CAN frames 110 and 120 disassembled according to ISO 15765 standard.

The ECU0 100 and the ECU1 200 connected between the CAN network domain and an Ethernet network domain convert the CAN frames 110 and 120 into Ethernet frames 130 and 140, respectively, and transmit the Ethernet frames 130 and 140 to an ECU 2 300.

In this case, the CAN-Ethernet conversion of the ECU0 100 and the ECU1 200, which are connected between the CAN network domain and the Ethernet network domain, is performed by a frame conversion apparatus mounted on the ECU0 100 and the ECU1 200.

Figure 2:
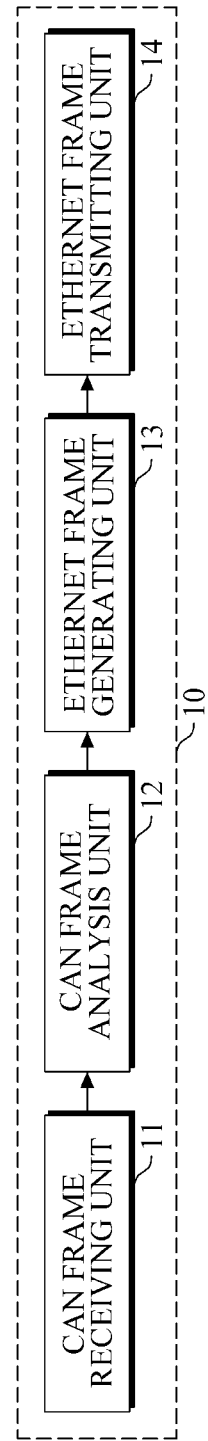
FIG. 2 is a block diagram illustrating a configuration of a frame conversion apparatus in accordance with the present invention.

FIG. 2 is a block diagram illustrating a configuration of a frame conversion apparatus for converting a CAN frame into an Ethernet frame in accordance with the present invention. Referring to FIG. 2, a frame conversion apparatus 10 in accordance with an example embodiment of the present invention includes a CAN frame receiving unit 11, a CAN frame analysis unit 12, an Ethernet frame generating unit 13, and an Ethernet frame transmitting unit 14.

Figure 3:
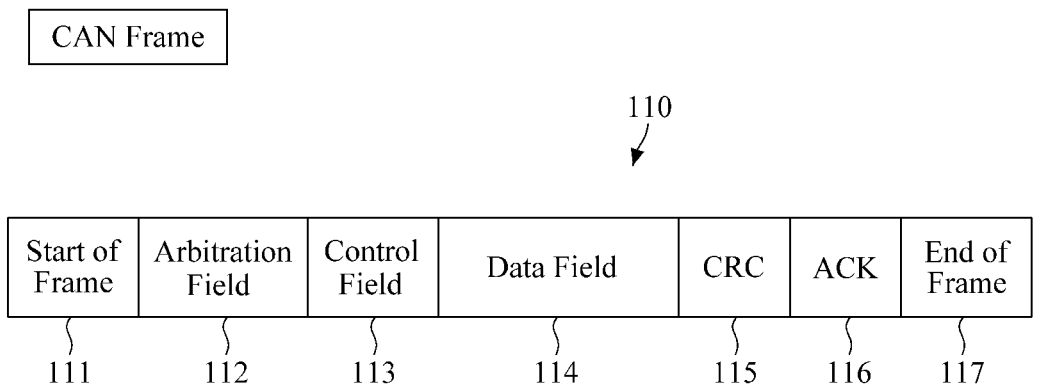
FIG. 3 is a diagram illustrating a structure of a CAN frame.

The CAN frame receiving unit 11 receives CAN frames from a CAN network domain. FIG. 3 is a diagram illustrating a structure of a CAN frame. Referring to FIG. 3, the CAN frame 110 includes 'Start of Frame' 111, 'Arbitration Field' 112, 'Control Field' 113, 'Data Field' 114, 'Cyclic Redundancy Check (CRC) Field' 115, 'ACKnowledge (ACK) Field' 116, and 'End of Frame' 117.

The 'Start of Frame' 111 indicates the start of a frame. The 'Arbitration Field' 112 indicates an identifier and the type of a frame. The 'Control Field' 113 indicates the length of the data field 114 and the type of a frame. The 'Data Field' 114 indicates actual data that is transmitted. The 'CRC Field' 115 is used to detect a frame transmission error. The 'ACK Field' 116 indicates that the frame has been received without error. The 'End of Frame' 117 indicates the end of the frame.

The CAN frame analysis unit 12 analyzes the CAN frames received by the CAN frame receiving unit 11 to extract data to be transmitted. Since the data field of an Ethernet frame used to transmit CAN frames in bulk at a high speed is larger than the data field of a CAN frame, a plurality of pieces of data transmitted in CAN frames is included in the Ethernet frame and transmitted.

To this end, the CAN frame analysis unit 12 analyzes the CAN frames received by the CAN frame receiving unit 11 to extract data that is transmitted through an Ethernet frame. For example, in a case in which data to be transmitted is disassembled into ten pieces and received through 10 CAN frames from the CAN network domain, the CAN frame analysis unit 12 extracts the disassembled ten pieces of data from respective 'Data Fields' of the 10 CAN frames, and combines the ten pieces of data to generate a single piece of data that is transmitted.

The Ethernet frame generating unit 13 generates an Ethernet frame including an identifier, a first frame region which is selective and includes information about a length of data transmitted, and a plurality of second frame regions which include information about a data segment assembly sequence, as a data field, wherein the data that is extracted by the CAN frame analysis unit 2 to be transmitted is disassembled into segments of data in units of a certain number of bytes, and the disassembled segments of data are arranged by distribution to the first frame region and the second frame regions.

Figure 4:
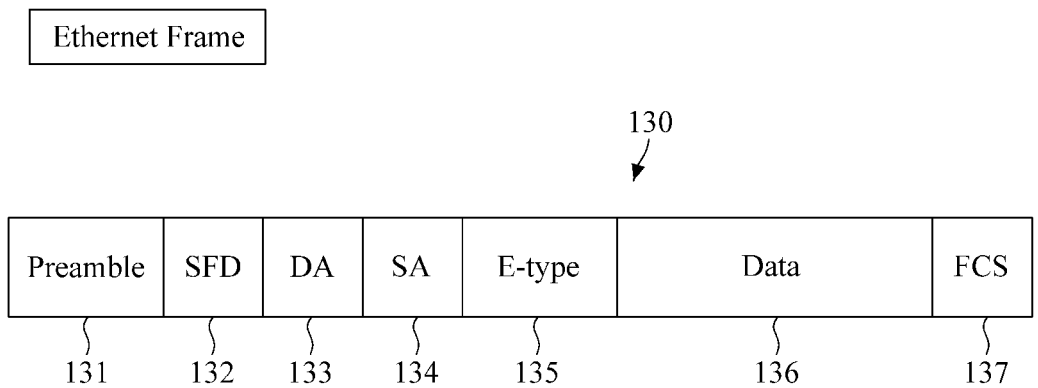
FIG. 4 is a diagram illustrating a structure of an Ethernet frame.

FIG. 4 is a diagram illustrating a structure of an Ethernet frame. The Ethernet frame 130 generated by the Ethernet frame generating unit 13 includes 'Preamble' 131, 'Start Frame Delimiter (SFD)' 132, 'Destination Address (DA)' 133, 'Source Address (SA)' 134, 'E-type' 135, 'Data Field' 136, and 'Frame Check Sequence (FCS)' 137.

The 'Preamble' 131 records information used for synchronization. The 'SFD' 132 indicates the start of a frame. The 'DA' 133 indicates a destination address at which data is received. The 'SA' 134 indicates a source address from which a data is transmitted. The 'E-type' 135 indicates a type of the Ethernet frame. The 'Data Field' 136 indicates actual data that is transmitted. The 'FCS' 137 is a field used to determine whether an error exists in the frame.

The present invention is characterized in that the 'Data Field' 136 of an Ethernet frame is configured to include an identifier, a first frame region including information about the length of data that is transmitted, and a plurality of second frame regions selectively including information about a data segment assembly sequence.

FIG. 5 is a diagram illustrating a structure of a data field of an Ethernet frame generated by the frame conversion apparatus in accordance with an example embodiment of the present invention. FIG. 6 is a diagram illustrating an example of a specification of a data field of an Ethernet frame. Referring to FIGS. 5 and 6, the 'Data Field' 136 of the Ethernet frame includes an identifier ID, which is used to identify the Ethernet frame when the data transmitted through the 'Data Field' is reassembled, in the beginning of the 'Data Field' 136 of the Ethernet frame.

A first frame region FF N_PDU is located after the identifier ID, and the first frame region FF N_PDU includes a 'FF N_PCI' field recording information about the length 'FF_DL' of the data transmitted, and a 'FF N_Data' field recording the first data segment.

A plurality of second frame regions CF N_PDU are located after the first frame region FF N_PDU, and the second frame regions CF N_PDU each include a 'CF N_PCI' field recording information about a data segment assembly sequence, and a 'CF N_Data' field recording the second and following data segments.

Meanwhile, in a case in which all the second frame regions can be transmitted in a single Ethernet frame, the Ethernet frame generating unit 13 may include only data segments and not information about the data segment assembly sequence in the second frame region.

Figure 7:
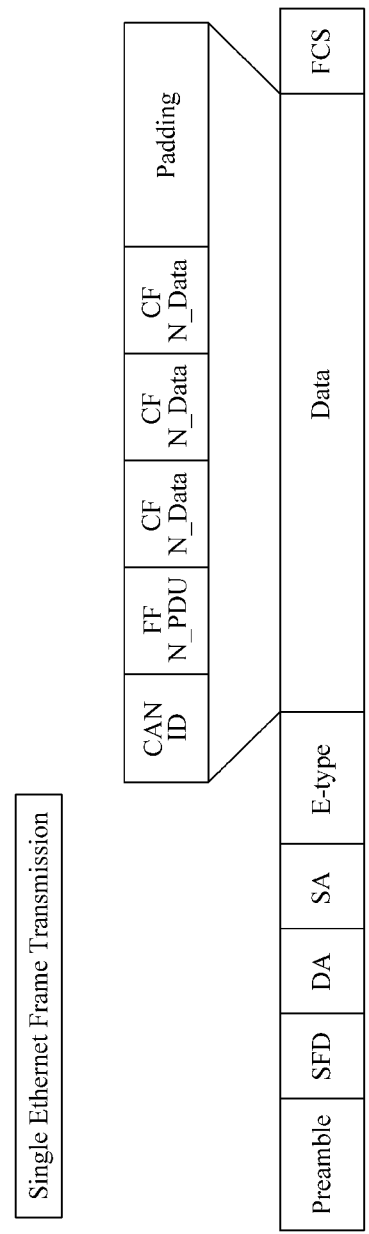
FIG. 7 is a diagram illustrating an example of a single-mode Ethernet frame.

FIG. 7 is a diagram illustrating an example of a single-mode Ethernet frame. Referring to FIG. 7, in a case in which all of the second frame regions can be transmitted in a single Ethernet frame, only the 'CF N_Data' fields recording data segments, and not the 'CF N_PCI' field recording the information about the data segment assembly sequence, is included in the second frame region.

Meanwhile, in a case in which all of the second frame regions cannot be transmitted in a single Ethernet frame and are transmitted in a plurality of Ethernet frames, the Ethernet frame generating unit 13 only includes an identifier and second frame regions, not a first frame region, in the second and following Ethernet frames. In this case, the Ethernet frame generating unit 13 allows information about the data segment assembly sequence to be included in a preceding second frame region among the second frame regions included in the second and following Ethernet frames.

Figure 8:
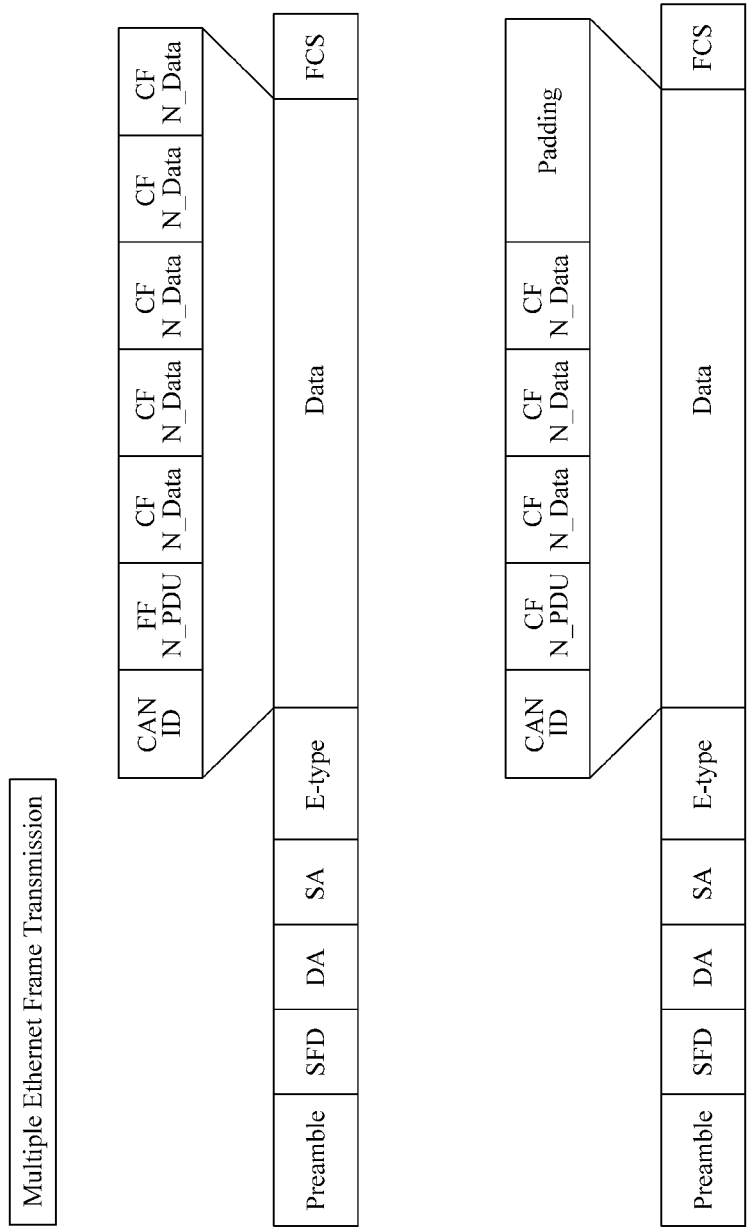
FIG. 8 is a diagram illustrating an example of a multi-mode Ethernet frame.

FIG. 8 is a diagram illustrating an example of a multi-mode Ethernet frame. Referring to FIG. 8, in a case in which all of the second frame regions cannot be transmitted in a single Ethernet frame and are transmitted in a plurality of Ethernet frames, a first Ethernet frame includes an identifier ID, a first frame region FF N_PDU, and 'CF N_Data' fields, and the second and following Ethernet frames each do not include a first frame region. Also, a preceding second frame region, following an identifier ID, is filled with a 'CF N_PCI' field storing information about a data segment assembly sequence and 'CF N_Data' fields storing data segments, and in the following second frame regions, only 'CF N_Data' fields are included.

Meanwhile, the Ethernet frame generating unit 13 may dynamically adjust numbers of the first frame region and the second frame regions included in an Ethernet frame, thereby minimizing an unused portion of the Ethernet frame.

Referring to FIGS. 7 and 8, 'Padding' is a field used to fill in an unused region, and in order to minimize the 'Padding' field, the Ethernet frame generating unit 13 calculates the number of segments of data for minimizing the 'Padding' field by use of the total length of data transmitted, and dynamically adjusts numbers of data segments to be included in a single Ethernet frame, that is, numbers of first frame regions and second frame regions.

The Ethernet frame transmitting unit 14 transmits the Ethernet frame generated by the Ethernet frame generating unit 13 to the Ethernet network domain. In accordance with the above example embodiment of the present invention, through the frame conversion apparatus, the CAN frame data is efficiently converted into the Ethernet frame data, so that high-volume transmission of CAN data is achieved at a high speed.

Figure 9:
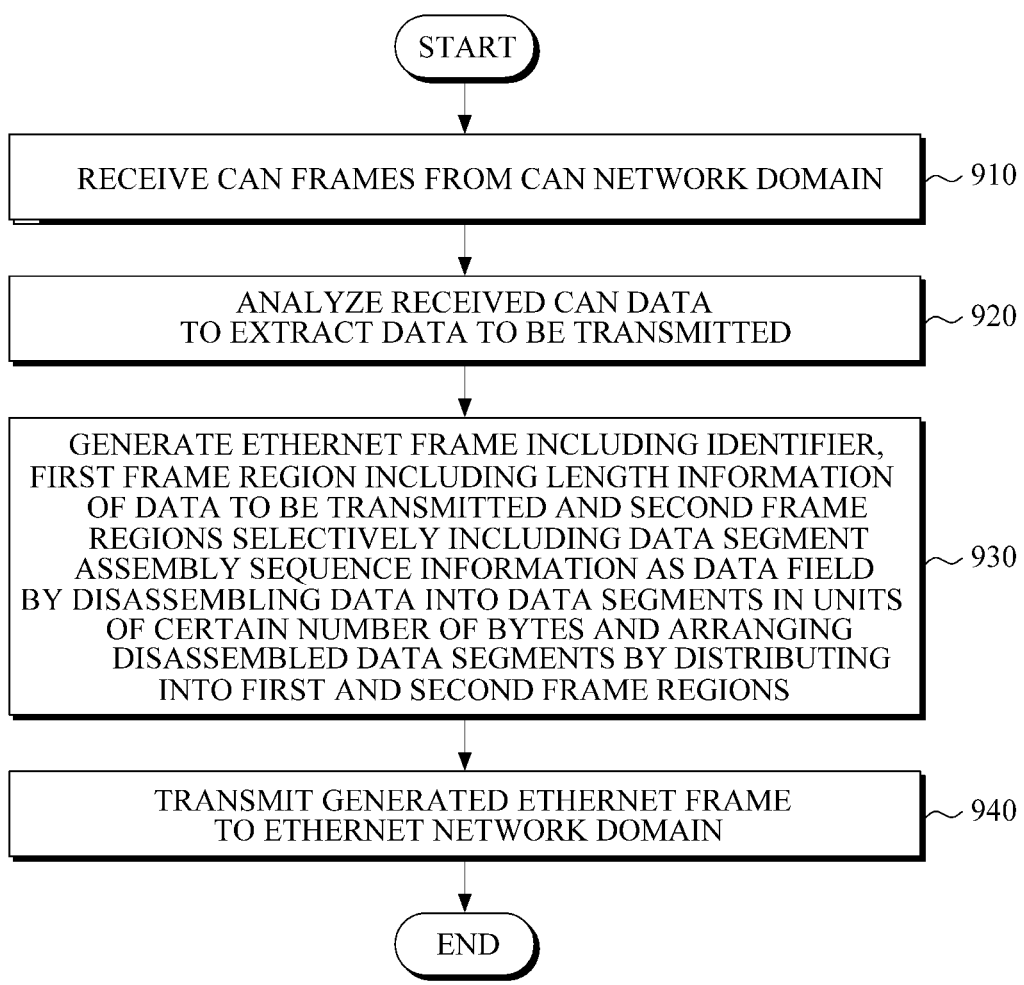
FIG. 9 is a flowchart showing a frame conversion method of a frame conversion apparatus in accordance with an example embodiment of the present invention.

Hereinafter, a frame conversion operation of the frame conversion apparatus in accordance with the present invention will be described. FIG. 9 is a flowchart showing a frame conversion method of converting a CAN frame into an Ethernet frame using a frame conversion apparatus in accordance with an example embodiment of the present invention.

First, a frame conversion apparatus for converting a CAN frame into an Ethernet frame receives CAN frames from a CAN network domain (910).

Thereafter, the frame conversion apparatus analyzes the CAN frames received in Operation 910 of receiving the CAN frames to extract data to be transmitted (920). This has been described above.

Thereafter, the frame conversion apparatus generates an Ethernet frame (930) including an identifier, a first frame region which includes information about a length of data transmitted, and a plurality of second frame regions which selectively includes information about a data segment assembly sequence, as a data field, wherein the data extracted in Operation 920 of analyzing the CAN frames for transmission is disassembled into segments of data in units of a certain number of bytes and the disassembled segments of data are arranged by distribution to the first frame region and the second frame regions.

In Operation 930 of generating the Ethernet frame, in a case in which all of the second frame regions can be transmitted in a single Ethernet frame, the frame conversion apparatus may include only the data segments and not the information about the data segment assembly sequence in the second frame region.

Meanwhile, in Operation 930 of generating the Ethernet frame, in a case in which all of the second frame regions cannot be transmitted in a single Ethernet frame and are transmitted in a plurality of Ethernet frames, the frame conversion apparatus includes only the identifier and the second frame regions, not the first frame region, in the second and following Ethernet frames. In this case, the frame conversion apparatus includes the information about the data segment assembly sequence in a preceding second frame region among the second frame regions included in the second and following Ethernet frames.

Meanwhile, in Operation 930 of generating the Ethernet frame, the CAN—Ethernet frame conversion apparatus dynamically adjusts numbers of the first frame region and the second frame regions included in an Ethernet frame so as to minimize an unused portion of the Ethernet frame. Generating of the Ethernet frame has been described above.

The frame conversion apparatus transmit the Ethernet frame generated in Operation 930 of generating the Ethernet frame, to the Ethernet network domain (940).

In accordance with the above example embodiment of the present invention, through the frame conversion apparatus, CAN frame data is efficiently converted into Ethernet frame data, so that high-capacity transmission of CAN data is achieved at a high speed.

The present invention can be implemented as computer-readable codes in a computer-readable recording medium. The computer-readable recording medium includes all types of recording media in which computer-readable data are stored. Examples of the computer-readable recording medium include a ROM, a RAM, a CD-ROM, a magnetic tape, a floppy disk, and an optical data storage. Further, the recording medium may be implemented in the form of carrier waves such as those used in Internet transmission. In addition, the computer-readable recording medium may be distributed to computer systems over a network, in which computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A frame conversion apparatus for converting a Controller Area Network (CAN) frame into an Ethernet frame, the apparatus comprising:
    a hardware computing device, and
    a non-transitory storage medium containing program instructions stored thereon, execution of which by the hardware computing device causes the frame conversion apparatus to provide functions of:
    a CAN frame receiving unit configured to receive CAN frames from a CAN network domain;
    a CAN frame analysis unit configured to analyze the CAN frames received by the CAN frame receiving unit, and extract data to be transmitted;
    an Ethernet frame generating unit configured to generate an Ethernet frame including an identifier, a first frame region which is selective and includes information about a length of data transmitted, and a plurality of second frame regions which selectively include information about a data segment assembly sequence, as a data field, wherein the data extracted by the CAN frame analysis unit to be transmitted is disassembled into segments of data in units of a certain number of bytes and the disassembled segments of data are arranged by distribution to the first frame region and the second frame regions; and
    an Ethernet frame transmitting unit configured to transmit the Ethernet frame generated by the Ethernet frame generating unit to an Ethernet network domain, wherein
    the Ethernet frame generating unit, in a case in which all of the second frame regions cannot be transmitted in a single Ethernet frame and are transmitted in a plurality of Ethernet frames, includes only the identifier and the second frame regions, not the first frame region, in a second and following Ethernet frames, and includes the information about the data segment assembly sequence in each preceding second frame region among second frame regions included in the second and following Ethernet frames.

2. The frame conversion apparatus of claim 1, wherein the Ethernet frame generating unit, in a case in which all of the second frame regions can be transmitted in a single Ethernet frame, includes only the data segments and not the information about the data segment assembly sequence in the second frame region.

3. The frame conversion apparatus of claim 1, wherein the Ethernet frame generating unit dynamically adjusts numbers of the first frame region and the second frame regions included in an Ethernet frame so as to minimize an unused portion of the Ethernet frame.

4. A frame conversion method of a frame conversion apparatus for converting a Controller Area Network (CAN) frame into an Ethernet frame, the method comprising:
    receiving CAN frames from a CAN network domain;
    analyzing the received CAN frames to extract data to be transmitted;
    generating an Ethernet frame including an identifier, a first frame region which includes information about a length of data transmitted, and a plurality of second frame regions which selectively include information about a data segment assembly sequence, as a data field, wherein the data extracted in the analyzing of the CAN frames to be transmitted is disassembled into segments of data in units of a certain number of bytes and the disassembled segments of data are arranged by distribution to the first frame region and the second frame regions; and
    transmitting the generated Ethernet frame to an Ethernet network domain, wherein
    the generating an Ethernet frame includes, in a case in which all of the second frame regions cannot be transmitted in a single Ethernet frame and are transmitted in a plurality of Ethernet frames, including only the identifier and the second frame regions, not the first frame region, in a second and following Ethernet frames, and including the information about the data segment assembly sequence in each preceding second frame region among second frame regions included in the second and following Ethernet frames.

5. The frame conversion method of claim 4, wherein the generating of the Ethernet frame, in a case in which all of the second frame regions can be transmitted in a single Ethernet frame, comprises including only the data segments and not the information about the data segment assembly sequence in the second frame region.

6. The frame conversion method of claim 4, wherein the generating of the Ethernet frame comprises dynamically adjusting numbers of the first frame region and the second frame regions included in an Ethernet frame so as to minimize an unused portion of the Ethernet frame.

\* \* \* \* \*